United States Patent [19]

Kubik

[11] Patent Number: 4,941,247
[45] Date of Patent: Jul. 17, 1990

[54] SEALING ARRANGEMENT FOR A ROLL

[75] Inventor: Klaus Kubik, Krefeld, Fed. Rep. of Germany

[73] Assignee: Eduard Küsters Maschinenfabrik GmbH & Co. KG, Krefeld, Fed. Rep. of Germany

[21] Appl. No.: 336,223

[22] Filed: Apr. 11, 1989

[30] Foreign Application Priority Data

Apr. 22, 1988 [DE] Fed. Rep. of Germany ....... 3813596

[51] Int. Cl.⁵ ..................... B21B 13/02; B21B 31/32
[52] U.S. Cl. ................... 29/116.2; 29/116.1; 100/162 B
[58] Field of Search .............. 29/113.1, 113.2, 116.1, 29/116.2; 100/162 B, 170; 384/99, 100; 72/243, 245

[56] References Cited

U.S. PATENT DOCUMENTS 4,656,709  4/1987  Mingers et al. ............... 29/113.1
4,757,984  7/1988  Pav et al. ..................... 29/116.2

*Primary Examiner*—Joseph M. Gorski
*Assistant Examiner*—S. Thomas Hughes
*Attorney, Agent, or Firm*—Kenyon & Kenyon

[57] ABSTRACT

A sealing arrangement for a roll having a stationary crosshead extending through a rotating hollow roll, which forms an outer working roll circumference, includes longitudinal seals and transverse end seals disposed against the inside circumference of the hollow roll. The seals form at least one longitudinal chamber in the annular clearance space between the crosshead and hollow roll. The longitudinal chamber may be filled with pressure liquid for supporting the hollow roll. Each transverse end seal has a relief chamber formed by a recess in the side of the transverse end seal facing away from the longitudinal chamber and a shoulder of a circumferential slot in the crosshead in which the transverse end seal is disposed. A pressure chamber is formed between the bottom of the circumferential slot and the bottom side of the transverse end seal. Both chambers are in fluid communication with the longitudinal chamber.

14 Claims, 3 Drawing Sheets

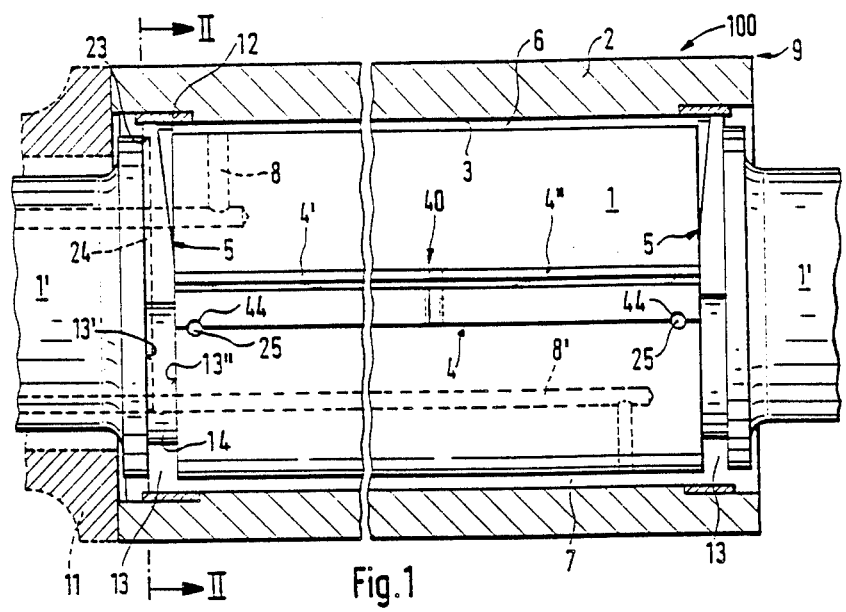
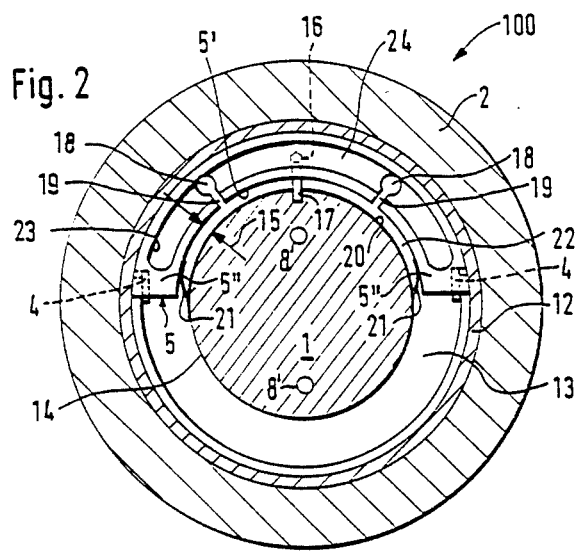

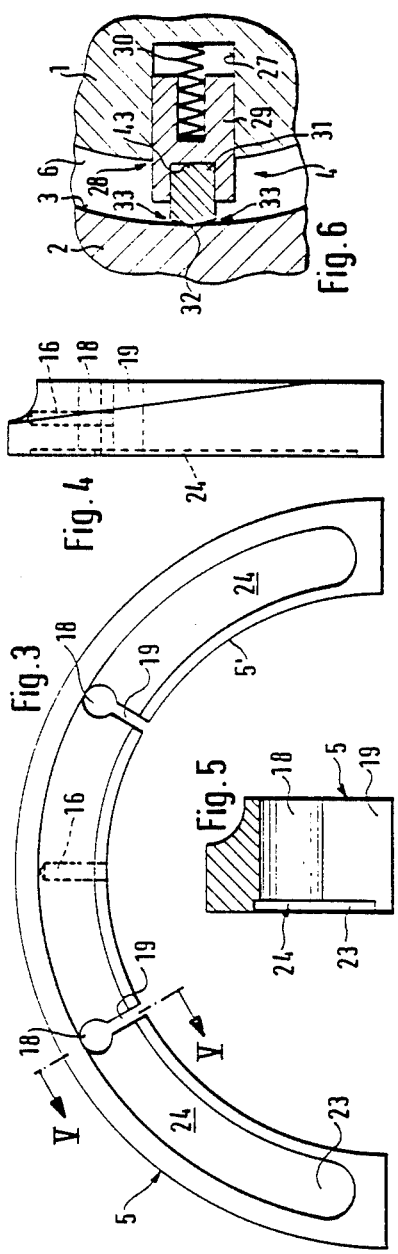
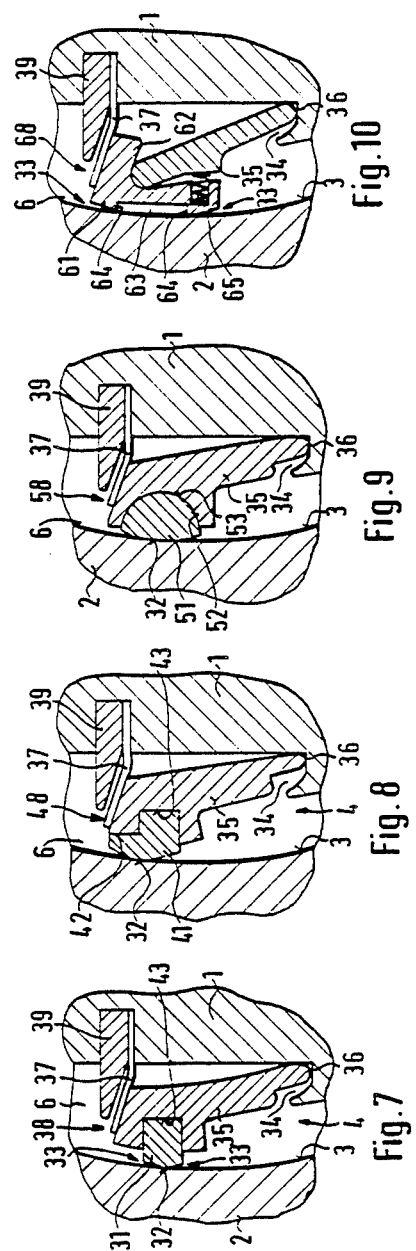

SEALING ARRANGEMENT FOR A ROLL

BACKGROUND OF THE INVENTION

The invention relates generally to rolls and, more particularly, to an improved sealing arrangement for hydraulically supported rolls.

Such rolls typically comprise a rotatable hollow roll forming a working roll circumference and a stationary crosshead extending lengthwise through the hollow roll to form an annular clearance space therewith. The crosshead has ends protruding from the hollow roll to which external forces can be applied for supporting the roll. Circumferentially spaced longitudinal seals are attached to the crosshead to abut the inner circumference of the hollow roll. Axially spaced transverse end seals having a generally semi-annular configuration are engaged in respective circumferential slots of the crosshead such that the transverse end seals are secured in the circumferential slots against rotation and are displaceable in the action plane of roll. The longitudinal and transverse end seals define at least one longitudinal chamber in the annular clearance space.

In such hydraulically supported rolls, the force generating the line pressure in the roll gap is transferred to the inner circumference of the rotating hollow roll. The circumference of longitudinal chamber is sealed by the longitudinal seals and the ends of the chamber are sealed by the transverse end seals, thereby forming a largely closed pressure space. The transverse end seals are located at the ends of the hollow roll to enable the line pressure to act along the longitudinal extent of the hollow roll. The transverse end seals pose no major problems if the bearings rotatably supporting the roll are located between the hollow roll, itself, and the crosshead, as is disclosed in German Patent No. 2025777. These bearings are arranged directly adjacent the transverse end seals and act to center the crosshead within the hollow roll to minimize the radial displacement of the transverse end seal and its countersurface.

Although the transverse end seals are fixed in position at the ends of the hollow roll in rolls of the type discussed above, there also are rolls in which the bearings are axially spaced at some distance outside the end cross seals, as is disclosed in German patent document No. 3608374, which may result in deflection of the end seals. In other rolls, the crosshead can be radially displaced in a guide relative to the hollow roll, such as is disclosed in German patent document No. 22524392 which shows a roll having a different hollow roll support arrangement. In rolls with this type of support arrangement, there is no centering action provided by the bearings. Thus, in the vicinity of the transverse end seals, considerable radial displacements between the crosshead and the hollow roll occur. These displacements can have an adverse effect on the operation of a transverse end seal. These effects include power losses due to the pressure liquid flowing out of leakage points of the transverse end seal. The leaks may be so extensive that the required high operating pressures can no longer be achieved.

Another problem arising from leaking transverse end seals occurs in rolls using a high temperature thermal oil for the pressure liquid and a separate lubricating oil for the bearings, which oils must be maintained separate and not intermixed. Reliable transverse end seals are necessary in rolls experiencing relative radial displacements between the crosshead and the hollow roll, whether by design or by virtue of bearings permitting deflection of the crosshead in the hollow roll, to prevent the undesirable mixing of oils, as well as to prevent power losses and the like.

SUMMARY OF THE INVENTION

The invention is directed to provision of a sealing arrangement for a roll that avoids the above-mentioned problems and disadvantages of the prior art to reliably seal the longitudinal pressure chamber of the roll. The invention accomplishes this goal by providing a sealing arrangement for a roll comprising a rotatable hollow roll having an outer working roll circumference and a stationary crosshead extending through the hollow roll to form an annular clearance space between an outer circumference of the crosshead and an inner circumference of the hollow roll. The crosshead has ends protruding from the hollow roll to which external forces can be applied for supporting the roll. Circumferentially spaced longitudinal seals attached to the crosshead abut the inner circumference of the hollow roll, while axially spaced transverse end seals having a generally semi-annular configuration are engaged in respective circumferential slots in the crosshead formed between axially spaced shoulders and a bottom surface of the slot. The transverse end seals are secured in the circumferential slots against rotation and are displaceable in a plane perpendicular to the longitudinal axis of the roll. At least one longitudinal chamber is formed in the annular clearance space between the longitudinal seals and the transverse end seals for supporting the hollow roll with pressure liquid contained therein. A hydraulic relief chamber, in fluid communication with the longitudinal chamber, is formed at each of the transverse end seals. Each hydraulic relief chamber is bounded by a recess in a side of its respective transverse end seal facing away from the longitudinal chamber and one of the axially spaced shoulders that contacts the side to define a contact region therebetween. The relief chamber extends over substantially the entire region of contact between the respective transverse end seal and shoulder. A substantially closed pressure chamber, in fluid communication with the longitudinal chamber, is formed between the bottom of its respective circumferential slot and a bottom side of its respective transverse end seal. The pressure chamber remains substantially closed, even after displacement of its respective transverse end seal in the circumferential slot, for exerting a radially outward-directed force on its respective transverse end seal.

The hydraulic relief chamber prevents the contact pressure at the shoulder of the slot facing away from the longitudinal chamber from becoming too large. In this manner, the end seal is movable in the slot by relatively small forces. This is particularly significant if the transverse end seal protrudes rather far from the slot and offset moments also may act thereon. The pressure of the liquid in the pressure chamber is derived from the pressure in the longitudinal chamber and serves to continuously reposition the transverse end seal if the hollow roll is removed from the active side of the crosshead. Otherwise, the pressure chamber holds the transverse end seal in contact with the hollow roll with a force that increases with increasing pressure in the longitudinal chamber.

The pressure chamber changes shape if the transverse end seal changes its location, but remains substantially closed. The pressure chamber also has a semi-annular shape bounded by the bottom slot surface and the bottom side of transverse end seal, which form its radial and axial boundaries. In the circumferential direction of the pressure chamber, the transverse end seal has ends, which usually lie on diametrically opposite sides of the crosshead. The space bounded between these ends and the slot is normally open.

The ends of the pressure chamber may be closed by elastically resilient members, which may be formed as spring strips having a width corresponding to the width of the slot. The strips are fixed to the bottom of the slot to extend at an acute angle against the bottom side of the transverse end seal. Such an arrangement is not required to be hermetically tight as long as the desired pressure within the chamber can be maintained with normal pumping power.

The connection of the pressure chamber to the longitudinal chamber may be provided by at least one axially extending passage in the transverse end seal. The pressure in the longitudinal chamber pushes the transverse end seal against the opposite shoulder of the slot. Therefore, a certain amount of play exists between the shoulder of the slot facing the longitudinal chamber and the transverse end seal. The pressure liquid in the longitudinal chamber enters this space and is transferred through the axial extending passage into the relief chamber located on the opposite side. The narrowness of the gap between the transverse end seal and the shoulder of the slot disposed adjacent the longitudinal chamber prevents large amounts of liquid from flowing out of the longitudinal chamber. On the other hand, the transferred quantity is sufficient to build up the desired pressure in the relief chamber.

The passage in the transverse end seal extends radially to the bottom side of the transverse end seal for two reasons--first, for providing a fluid path to the pressure chamber formed under the transverse end seal between the latter and the bottom surface of the slot such that the pressure chamber can be filled with pressure liquid from the longitudinal chamber, and secondly, for flexibility such that the transverse end seal may conform to the shape of the inner circumference of the hollow roll particularly well.

Another aspect of the invention concerns the connection of the transverse end seal to the longitudinal seal, which has end surfaces abutting the lateral surface of the transverse end seal that faces the longitudinal chamber. The longitudinal seals are usually formed from a material that has a different coefficient of expansion from that of the crosshead. In general, the coefficient of expansion of the sealing material is larger than that of steel. Thus, with a cold roll, considerable play must be left between the longitudinal seal, which has considerable length over which it expands, and the transverse end seal. If enough play is not provided, at high temperatures of the pressure liquid in the longitudinal chamber, jamming of the transverse end seal under the action of the expanding longitudinal seal occurs as the transverse end seal is pressed by the longitudinal seal against the distal shoulder of the slot. The transverse end seal then is no longer free to move in the radial direction, thereby producing leaks and heavy wear.

In order to avoid this detrimental effect, the longitudinal seals are fixed at the transverse end seals such that they can not be displaced in the longitudinal direction. In addition, they are spaced at a distance from the transverse end seals that ensures free play of the transverse end seal in its slot without forming too large of a leak. Somewhere in the middle of the longitudinal extent of the longitudinal seal a division is formed at which point the adjacent intermediate ends of the halves of the longitudinal seal somewhat overlap such that a certain amount of relative displacement of the two overlapping ends is possible without the occurrence of a major leak. The fixation of the ends of the longitudinal seals to prevent longitudinal movement may be accomplished by the use of transverse pins.

In many cases longitudinal seals are constructed in accordance with those disclosed in German Patent No. 1193739. In the contact zone with the inner roll circumference, the longitudinal seals in this patent have a contact area of a certain width, the shape of which conforms to the shape of the inner circumference of the hollow roll. Such a matching contact surface may be specially prepared or may be formed after a certain amount of operation time. The seal operates optimally and slides on a film of liquid with relatively little contact pressure as long as the full area of the contact surface abuts the inner circumference of the hollow roll. However, upon displacement of the hollow roll relative to the crosshead, the position of the longitudinal seal changes slightly and facets having higher contact pressure and greater wear are formed at the contact surface.

This displacement can lead to leakage and other undesirable effects which may be reduced by forming the longitudinal seals from strips supported at one longitudinal edge by the crosshead that are pivotable under the pressure of liquid in the longitudinal chamber about a longitudinal edge of the strip disposed adjacent the inner circumference of the hollow roll. The longitudinal strips have a sealing or contact surface abutting the inner circumference of the hollow roll such that the radial displacement of the crosshead relative to the hollow roll produces a minimum change in the orientation of the contact surface relative to the inner circumference. There are different positions at which the longitudinal seals may be attached to the crosshead. The point that should be chosen for attaching the longitudinal seal to minimize the detrimental effects from displacement of the seal is a point at which for a given displacement of the hollow roll relative to the crosshead, the angular change of the contact surface relative to the inside circumference of the hollow roll is minimized. This point may be geometrically determined according to the principles of the invention.

Alternatively, one part of the longitudinal seal formed as an insert having the contact surface can pivot relative to another part receiving the insert for automatic adjustment relative to the inner circumference of the hollow roll. This may be accomplished by forming the pivotable insert with a convex back surface received in a correspondingly shaped recess in the other part.

To aid in the formation of the sliding film between the contact surface of the longitudinal seal and the inner circumference of the hollow roll, an outer portion of the contact surface may be curved away from the inner circumference to form at least one gap. In this manner, the oil film that sticks to the inner circumference of hollow roll is drawn into the gap resulting from the curvature to build up a supporting liquid layer between the longitudinal seal and the inner circumference of the hollow roll (known as the "Mitchell effect"). This is similar to the disclosure in German Patent No. 1461066 relating to hydraulically loaded pressure shoes.

In the type of seal disclosed in German Patent No. 1193739, the pressure at which the contact surface is pressed against the inner circumference of the hollow roll depends upon the pressure in the longitudinal chamber. With high pressures in the longitudinal chamber, very high and wear-prone contact pressures can occur. In order to avoid this detrimental effect, a longitudinal recess can be provided in the contact surface of the longitudinal seal, which is automatically filled with pressure liquid for relieving the high contact pressure. A relief chamber provided with a feed line for a longitudinal seal of a different type is disclosed in German Patent No. 2025777.

The longitudinal seal of the invention may be formed from a single piece of material, or from two or more pieces including a low-friction and low-wear insert, such as is disclosed for transverse end seals in German Patent No. 3128722 and for longitudinal seals of a different type in German Patent No. 2718414.

Further features, advantages and embodiments of the invention are apparent from consideration of the following detailed description, drawings and appended claims.

BRIEF DESCRIPTION OF THE DRAWINGS

FIG. 1 shows a longitudinal section through a roll constructed according to the principles of the invention;

FIG. 2 shows a cross sectional view along the line II—II of FIG. 1;

FIG. 3 shows an end view of a transverse end seal of the invention separate from the roll;

FIG. 4 shows a side view of the right-hand side of transverse end seal of FIG. 3;

FIG. 5 shows an enlarged scale cross sectional view taken along the line V—V of FIG. 3;

FIGS. 6 to 10 show different embodiments of longitudinal seals of the invention;

DETAILED DESCRIPTION

Figure 11:
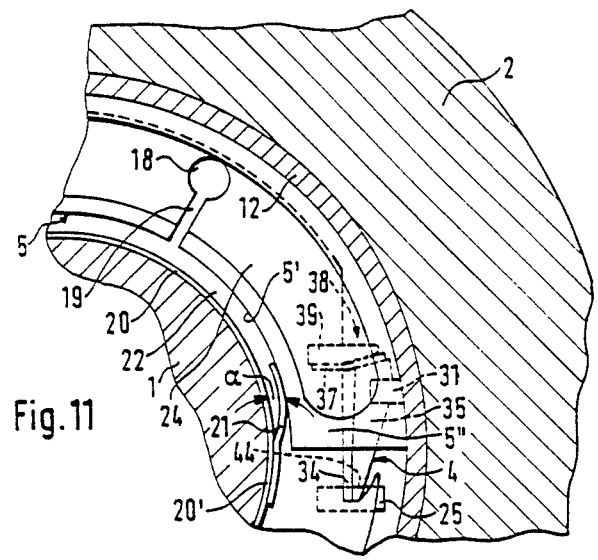
FIG. 11 shows a partial view of the cross section illustrated in FIG. 2 in enlarged scale.

The roll 100 illustrated in FIG. 1 comprises a stationary crosshead 1 that extends through a rotatable hollow roll 2 to form an annular clearance space therewith. The ends 1' of the crosshead 1 protrude from the hollow roll 2 for supporting the roll 100 in a roll stand, calendar or similar support structure.

The annular space between the crosshead 1 and the inner circumference 3 of the hollow roll 2 is subdivided by longitudinal seals 4 that may be attached to diametrically opposed sides of the crosshead 1 to abut the inner circumference 3 and longitudinally seal a substantially closed longitudinal chamber 6. Transverse end seals 5 are provided at the two opposite ends of the hollow roll to transversely seal the substantially closed longitudinal chamber 6. The remaining part of the clearance space forms a leakage chamber 7 for collecting any liquid that leaks from pressure chamber 6. Pressure liquid for supporting the hollow roll 2 can be fed to the longitudinal chamber 6 via a feedline 8 formed in the crosshead 1. In the embodiment shown in FIG. 1, the roll gap 9 between roll 100 and a unillustrated counterroll is located at the upper side of the roll 100. The longitudinal chamber 6 is formed on the top side of the crosshead 1 adjacent the roll gap 9 as a half-cylindrical shell. The pressure liquid contained in chamber 6 exerts a resulting force in the upward direction in the action plane of the roll to create the line pressure in the roll gap.

Liquid leaking past the longitudinal seals 4 into the leakage chamber 7 is discharged through a line 8'. The leakage chamber 7 may be sealed by transverse end seals (not shown) that prevent the liquid in chamber 7 from escaping from the ends of the hollow roll 2.

The hollow roll 2 is not rotatably supported on the cross head 1 within the length of the hollow roll. Such a support may, however, be provided by arranging bearings between respective extensions 11 attached to the end faces of the hollow roll 2 and the outer ends 1, of the crosshead. One such extension 11 is illustrated by dashed lines in FIG. 1. Such bearings would be spaced at a certain axial distance from the transverse end seals 5, which as previously mentioned allows deflection of the crosshead 1 within hollow roll 2. Alternatively, the hollow roll 2 may be guided for radial movement in the action plane only by a suitable guide ring (not shown), i.e., it may be supported for radial movement in the action plane relative to the crosshead 1.

With either of these support arrangements, certain radial displacements of the hollow roll 2 relative to the crosshead 1 and jamming may occur in the region of the transverse end seals 5, either due to the deflection of the crosshead 1 if support bearings are provided between the extensions 11 and the ends 1' of the crosshead 1, or due to a roll design that permits guided radial movement between the hollow roll 2 and the crosshead 1 in the action plane.

In order to accommodate for these displacements without producing an adverse effect on operation of the roll, the transverse end seal of the invention is specially constructed, as explained with reference to FIGS. 2 to 5. As shown in FIG. 2 transverse end seal 5 is formed as a segment of a ring, i.e., it has a semi-annular cross sectional shape, such that its outer circumference abuts an annular ring 12 inserted into a recess in the hollow roll 2. Each transverse end seal 5 is arranged in a circumferential slot 13 formed in the crosshead 1 between shoulders 13' and 13'' located in planes perpendicular to the longitudinal axis of the crosshead 1. When the transverse end seal 5 abuts the annular ring 12, a spacing 15 is formed between the inner bottom side 5' of the end seal 5 and the slot bottom 14. The transverse end seal 5 is secured against rotation with the hollow roll 2 and ring 12 by a pin 17, which is located between a hole in the crosshead 1 and a radial hole 16 of the transverse end seal 5.

In the embodiment shown, the transverse end seal 5 has two axially extending holes 18, which subdivide the transverse end seal 5 into three approximately equal parts, as seen in the circumferential direction of seal 5. Slots 19 extend from the holes 18 to the inner bottom side 5' of the transverse end seal 5. The holes 18 and slots 19 provide the transverse end seal 5 with flexibility to better conform to the shape of the ring 12.

As shown in FIG. 2, a sheet metal strip 20 extending across the entire width of the circumferential slot 13 may be arranged in the bottom 14 of the slot 13. The strip 20 may extend completely around slot 13 or approximately half-way around the slot. Resilient sheet metal strips 21 having the same width as slot 13 are connected to the inner ends of the transverse end seal 5, for instance, by spot welding at the ends 21' of the sheet metal strip. Strips 21 extend at an acute angle $\alpha$ (See FIG. 11) against the end region of the inner bottom side 5' of the transverse end seal 5 to resiliently rest against the latter and form a seal therebetween in the manner shown in FIGS. 2 and 11. The seal arrangement 20, 21 may be formed of plastic and also may be of a different construction than that shown as long as a pressure chamber is formed under the transverse end seal 5. In this embodiment, chamber 22 is bounded at its radially inward area by the mounting strip 20 resting on slot bottom 14, at its axial areas by the two spaced slot shoulders 13', 13", at its radially outward area by the bottom side 5' of the transverse end seal 5 and at its distal ends in the circumferential direction by spring strips 21. The pressure of the liquid contained in the pressure chamber 22 forces the transverse end seal 5 upward against the ring 12 into the position shown in FIG. 2.

The transverse end seal 5 is formed with a shallow recess 23, for instance, a 1 to 2 mm deep recess, formed in the side of seal 5 that faces away from the longitudinal chamber 6, i.e., in the vicinity of the contact area with the slot shoulder 13'. Chamber 23 is bounded on all sides by the seal 5 and extends over almost the entire circumferential length of the transverse end seal 5 to form a relief chamber 24. Relief chamber 24, when filled with liquid, generates a counterpressure that partially relieves the transverse end seal 5 from the outwardly directed axial pressure due to the pressure in longitudinal chamber 6.

The pressure chamber 22, as well as the relief chamber 24, are in communication with the pressure liquid in the longitudinal chamber 6. A certain amount of play exists between the transverse end seal 5 and slot shoulder 13" adjacent the longitudinal chamber 6. This play occurs under the pressure of the liquid in the longitudinal chamber 6. If the transverse end seal 5 rests firmly against the slot shoulder 13' only a narrow gap is available for the pressure liquid to flow between chambers 22 and 24 via the holes 18 and slots 19. The pressure of the liquid in chamber 22, thus cooperates to provide relief of the transverse end seal 5 in the axial direction in such a manner that the transverse end seal 5 remains relatively easily movable in the slot 13 and is automatically kept in contact with the ring 12.

As shown in FIG. 1, each of the longitudinal seals 4 may be divided at the middle of the seal at point 40. The inner intermediate ends of the two halves 4', 4" of seal 4 overlap at this point and are relatively movable such that halves 4' and 4" can be displaced slightly in the longitudinal direction. Thereby, in the event of differential thermal expansion between the crosshead 1 and the longitudinal seals 4, an excessively large opening at point 40 is prevented. At the outer ends of halves 4' and 4" adjacent the transverse end seals 5, the longitudinal seals are fixed from moving in the longitudinal direction by pins 25 (FIGS. 1, 11). One end of each pin is inserted into the crosshead, while the other end is fitted into a semicircular recess 44 provided at the lower edge of the longitudinal seals 4. The pins locate the outer ends of the seals 4 in a longitudinal position in front of the lateral surface of the transverse end seal 5 that inwardly faces the longitudinal chamber 6 with a small amount of play to prevent clamping of the transverse end seal 5 in circumferential slot 13. An enlarged view of the abutment of the transverse end seal 5 and the longitudinal seal 4 is shown in FIG. 11.

In FIG. 6, a first embodiment of a longitudinal seal 26 of the invention is shown. The longitudinal seal 26 is movably guided in a longitudinal slot 27 formed in the crosshead 1. The seal comprises a strip or a bar 29 that is pressed radially outward against the inner circumference 3 of the hollow roll 2 under the action of the biasing force of spring 30. An insert 31 of low-friction and low-wear material is provided at the side of the bar 29 facing inner circumference 3. Insert 31 has a sealing or contact surface 32, which substantially corresponds to the contour of the inner circumference 3. On both outward edges of the contact surface 32, the insert 31 curves away from the inner circumference 3 such that longitudinal gaps 33 are formed. Pressure liquid taken along in the gaps 33 at the inner circumference 3 of the rotating hollow roll 2 thereby may form a supporting liquid film between the insert 31 and the inner circumference 3. Since the roll should be able to rotate in both clockwise and counter-clockwise directions, the gaps 33 are provided on both sides of the insert 31.

In FIGS. 7 to 10 different versions of another type of longitudinal seal are shown in which the longitudinal seal has an approximately L-shaped cross section that comprises a profiled strip 35 having one longitudinal edge engaged in a groove-like recess 34 provided on the side of crosshead 1 to rest against the bottom 36 of the recess 34. Strip 35 may be pivoted about bottom 36, i.e., about an axis disposed parallel to the longitudinal axis of the roll. If the longitudinal chamber 6 is provided on the top of the roll, the profiled strip 35 is substantially vertical and slightly inclined outwardly against the inner circumference 3 of the hollow roll 2 such that contact surface 32 abuts the inner circumference 3. In FIG. 7 the contact surface 32 is constructed, in a manner similar to the embodiment of FIG. 6, as part of an insert 31, which is arranged in the upper region of the longitudinal seal 38 in a longitudinal slot 43 provided on the side of the strip 35 facing the inner circumference 3. The profiled strip 35 is pressed into the recess 34 from above by a spring leaf 37, which is secured in the crosshead 1 by a strip 39.

In the embodiment of FIG. 7, the insert 31 has a substantially rectangular cross section and the width of the contact surface 32 is limited if gaps 33 are formed. The contact surface 32 may be wider, such as shown in the embodiment of the longitudinal seal 48 of FIG. 8, where the insert 41 extends laterally in front of the end face 42 of the profiled strip 35.

In the longitudinal seal embodiment 58 shown in FIG. 9, the insert 51 has a convex or partially cylindrical back surface 52, which is slidably seated but not fastened in a recess 53 of the profiled strip 35 that has a correspondingly concave or half-cylindrical shape. The insert 51 is rotatable relative to strip 35 about an axis parallel to the longitudinal axis to automatically orient itself relative to the inner circumference 3 of the hollow roll 2 such that the entire area of the contact surface 32 always rests against the inner circumference 3.

The embodiment 68 of FIG. 10 also provides for mobility of the insert relative to the strip 35 about an axis parallel to the longitudinal axis, in addition to the pivotal nature of the profiled strip 35 about the bottom 36 of the recess 34. This is accomplished by provision of a separate head profile 61, which has a downwardly open groove-like recess 62 into which the profile strip 35 engages from below. The front side of the head profile 61 has a shallow longitudinal recess 63 extending over the length of head profile 61. Recess 63 is closed at its ends and contains a pressure liquid if gaps 33 are provided. In such a case, the pressure liquid taken along inner circumference 3 into the recess 63 due to rotation of hollow roll 2 is wiped off at the following radial boundary 64 of the recess 63. In this manner, a portion of the takenalong liquid does not emerge again at the opposite edge of the recess 63. Proper contact between the respective surfaces may be promoted by a spring 65 provided between the lower region of the head profile 61 and the profiled strip 35.

The sealing arrangement shown in FIG. 11 employs the longitudinal seal embodiment 38 of FIG. 7. In the immediate vicinity of the transverse end seal 5, the lower edge of the profiled strip 35 has semicircular recess 44 through which the cross pin 25 fits to properly position the end face of the longitudinal seal 38 relative to the transverse end seal 5.

Figure 12:
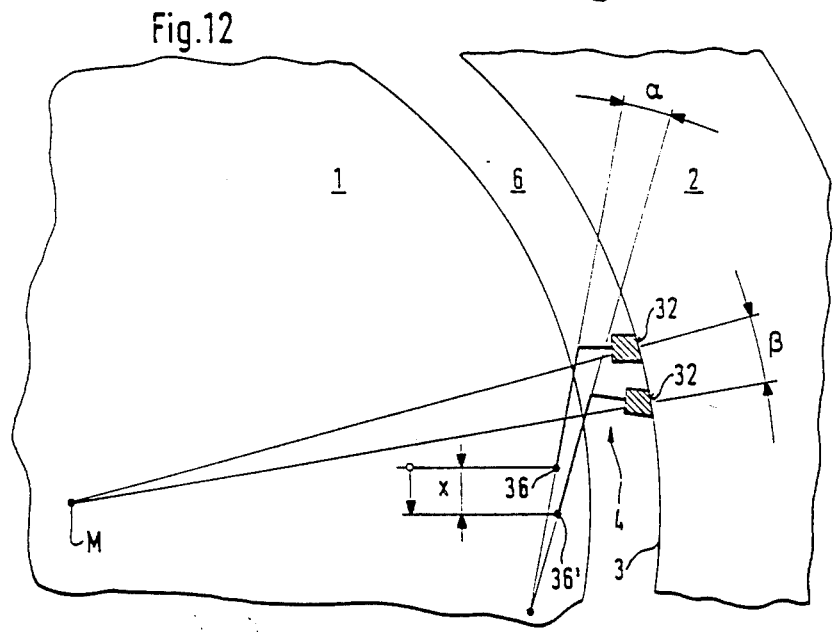
FIG. 12 shows a diagramatic cross sectional view illustrating certain geometric relationships with respect to longitudinal seal of the invention.

In FIG. 12 one advantageous attachment position of the longitudinal seal 4 to the crosshead 1 is schematically illustrated. Starting from the upper illustrated position of insert 32, it is assumed that the crosshead is displaced downwardly by the amount x at a given point along its longitudinal extent. This amount x may be the result of either a deflection of the crosshead or of a radial displacement of a relatively movable crosshead. The amount of deflection or displacement x means that the bottom 36 of the recess 34 also is downwardly displaced by the amount x into a position 36'. Assuming that the hollow roll 2 maintains its position, displacement of the bottom 36 of the recess 34 into the position 36' results in a corresponding downward displacement of the longitudinal seal 4, which remains in contact with the inner circumference 3 of the hollow roll 2. However, this displacement changes the offset position by angle $\alpha$. The longitudinal seals 4 should be attached at the side of the crosshead 1 at a height such that the central angle $\beta$, which is enclosed by the center of the contact surface 32 in the two positions, is equal to the angle $\alpha$ of the offset position of the longitudinal seal 4. In this manner, mispositioning of the contact surface 32 due to the displacement of the bottom 36 of the recess 34 supporting the longitudinal seals 4 is compensated for relative to the inner circumference 3. Thus, the contact surface 32 makes sealing contact with the inner circumference in the same manner as prior to the displacement or deflection.

What is claimed is:

1. A roll and sealing arrangement comprising:
   (a) a rotatable hollow roll having a longitudinal axis and an outer working roll circumference;
   (b) a stationary crosshead extending through the hollow roll, said crosshead having ends protruding from the hollow roll to which external forces can be applied for supporting the roll;
   (c) an annular clearance space formed between an outer circumference of the crosshead and an inner circumference of the hollow roll;
   (d) circumferentially spaced longitudinal seals attached to the crosshead, said longitudinal seals abutting the inner circumference of the hollow roll;
   (e) axially spaced transverse end seals having a generally semi-annular configuration engaged in respective, circumferential slots formed in the crosshead between axially spaced shoulders and a bottom surface of its respective slot, each transverse end seal being secured in one of said circumferential slots against rotation and being displaceable in a plane perpendicular to the longitudinal axis of the roll;
   (f) at least one longitudinal chamber formed in the annular clearance space between the longitudinal seals and the transverse end seals for supporting the hollow roll with pressure liquid contained therein;
   (g) a hydraulic relief chamber, in fluid communication with said at least one longitudinal chamber, formed at each of the transverse end seals, each hydraulic relief chamber being bounded by a recess in a side of one of said transverse end seals facing away from said at least one longitudinal chamber and one of the axially spaced shoulders that contacts said side to define a contact region therebetween, said relief chamber extending over substantially the entire contact region; and
   (h) a substantially closed pressure chamber, in fluid communication with said at least one longitudinal chamber, formed at each transverse end seal between the bottom surface of one of said circumferential slots and a bottom side of the transverse end seal engaged in said one circumferential slot, whereby said pressure chamber remains substantially closed, even after displacement of the transverse end seal in said one circumferential slot, for exerting a radially outward-directed force on the transverse end seal.

2. The roll and sealing arrangement of claim 1 wherein each pressure chamber has circumferentially spaced ends closed by elastically resilient members disposed in spaced positions below one of said transverse end seals between the bottom surface of the circumferential slot in which said one transverse end seal is engaged and the bottom side of said one transverse end seal.

3. The roll and sealing arrangement of claim 2 wherein each elastically resilient member has a width corresponding to the width of the circumferential slot in which it is disposed and is fixed to the bottom surface of this circumferential slot, each resilient member extending at an acute angle against the bottom side of its respective transverse end seal.

4. The roll and sealing arrangement of claim 3 wherein each elastically resilient member comprises a spring strip attached to a holding strip covering the bottom surface of the circumferential slot, said holding strip extending at least between the circumferentially spaced ends of the pressure chamber.

5. The roll and sealing arrangement of claim 1 wherein each transverse end seal has at least one axial passage extending between one of said relief chambers and said at least one longitudinal chamber.

6. The roll and sealing arrangement of claim 5 wherein said at least one axial passage includes a slot extending radially from said at least one axial passage to the pressure chamber at the bottom side of one of said transverse end seals.

7. The roll and sealing arrangement of claim 1 wherein each longitudinal seal has axially spaced ends each abutting a respective transverse end seal, said ends being fixed from movement in the longitudinal direction at a point adjacent its respective transverse end seal, each longitudinal seal being divided into at least two parts at a point intermediate the axially spaced ends to form intermediate ends relatively movable in the longitudinal direction upon a change in temperature to maintain the effectiveness of the longitudinal seal.

8. The roll and sealing arrangement of claim 7 wherein said axially spaced ends are fixed from movement in the longitudinal direction by a respective transverse pin provided adjacent the transverse end seal, said pin extending through a recess in the longitudinal seal to engage in corresponding recess in the crosshead.

9. The roll and sealing arrangement of claim 1 wherein each longitudinal seal is formed from a strip supported at one longitudinal edge thereof by the crosshead, said strip being pivotable under the pressure of liquid in the longitudinal chamber about the longitudinal edge such that a sealing surface of the strip substantially conforming to the inner circumference of the hollow roll abuts the inner circumference, said strip being positioned at the inner circumference such that a radial displacement of the crosshead relative to the hollow roll produces a minimum change in orientation between the sealing surface and the inner circumference.

10. The roll and sealing arrangement according to claim 1 wherein each longitudinal seal comprises first and second longitudinally extending parts, said first part having a sealing surface butting the inner circumference of the hollow roll and said second part being supported at the crosshead, said sealing surface being pivotable relative to the second part about a longitudinal axis parallel to the longitudinal axis of the hollow roll for maintaining contact of the sealing surface with the inner circumference of the hollow roll.

11. The roll and sealing arrangement according to claim 8 wherein said first part has a generally convex back surface and said second part has corresponding recess slidably receiving said back surface.

12. The roll and sealing arrangement according to claim 1 wherein each longitudinal seal has a longitudinally extending sealing surface abutting the inner circumference of the hollow roll, said sealing surface has a middle portion substantially conforming to the inner circumference of the hollow roll and an outer portion curved away from the inner circumference to form at least one gap therebetween.

13. The roll and sealing arrangement according to claim 10 wherein the sealing surface has a shallow recess extending substantially over the entire length of the longitudinal seal, said recess being open to the inner circumference of the hollow roll.

14. The roll and sealing arrangement according to claim 1 wherein each longitudinal seal comprises a strip supported at the crosshead along a longitudinal edge thereof, said strip being pivotable under the pressure of liquid in the longitudinal chamber about the longitudinal edge such that a sealing surface substantially conforming to the inner circumference of the hollow roll and formed as an insert disposed in a longitudinally extending recess in the strip abuts the inner circumference.

* * * * *

UNITED STATES PATENT AND TRADEMARK OFFICE
CERTIFICATE OF CORRECTION

PATENT NO. : 4,941,247

DATED : July 17, 1990

INVENTOR(S) : Klaus Kubik

It is certified that error appears in the above-identified patent and that said Letters Patent is hereby corrected as shown below:

Column 1, line 49, should read:
--disclosed in German patent document No. 2254392--

Column 6, line 14, should read:
--the end faces of the hollow roll 2 and the outer ends 1'--

Column 11, line 21, claim 10, change "...surface butting..." to read --...surface abutting...--

Column 12, line 2, claim 11, change "according to claim 8" to read --according to claim 10-- line 14, claim 13, change "according to claim 10" to read --according to claim 12--

Signed and Sealed this

Twenty-first Day of April, 1992

Attest:

HARRY F. MANBECK, JR.

Attesting Officer

Commissioner of Patents and Trademarks